(12) United States Patent
Nagasaka et al.

(10) Patent No.: US 10,780,670 B2
(45) Date of Patent: Sep. 22, 2020

(54) LAMINATE

(71) Applicant: Mitsubishi Chemical Corporation, Chiyoda-ku (JP)

(72) Inventors: Masahiko Nagasaka, Tokyo (JP); Takeshi Ishikawa, Tokyo (JP); Hayato Ogasawara, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 165 days.

(21) Appl. No.: 15/562,763

(22) PCT Filed: Apr. 1, 2016

(86) PCT No.: PCT/JP2016/060957
§ 371 (c)(1),
(2) Date: Sep. 28, 2017

(87) PCT Pub. No.: WO2016/159365
PCT Pub. Date: Oct. 6, 2016

(65) Prior Publication Data
US 2018/0079165 A1   Mar. 22, 2018

(30) Foreign Application Priority Data

Apr. 2, 2015  (JP) ................................ 2015-075520

(51) Int. Cl.
*B32B 5/02*   (2006.01)
*B32B 27/36*  (2006.01)
(Continued)

(52) U.S. Cl.
CPC .................. *B32B 5/02* (2013.01); *B32B 5/12* (2013.01); *B32B 5/26* (2013.01); *B32B 5/28* (2013.01);
(Continued)

(58) Field of Classification Search
CPC ... B32B 5/02; B32B 37/144; B32B 2307/558; B32B 27/34; B32B 27/365; C08J 5/04; C08J 5/042; C08J 5/24
See application file for complete search history.

(56) References Cited

U.S. PATENT DOCUMENTS

2009/0117366 A1  5/2009  Honma
2009/0312482 A1  12/2009  Feldermann et al.
(Continued)

FOREIGN PATENT DOCUMENTS

CN   101486265 A   7/2009
JP   7-164439 A    6/1995
(Continued)

OTHER PUBLICATIONS

Combined Chinese Office Action and Search Report dated Oct. 22, 2018 in Patent Application No. 201680020442.X, citing documents AA, AO and AQ therein, 17 pages (with unedited computer generated English translation).

(Continued)

*Primary Examiner* — Scott R. Walshon
*Assistant Examiner* — Jasper Saberi
(74) *Attorney, Agent, or Firm* — Oblon, McClelland, Maier & Neustadt, L.L.P.

(57) ABSTRACT

The present invention pertains to a carbon fiber reinforced plastic, and provides a carbon fiber reinforced plastic laminated body that is low cost and superior in moldability, mechanical characteristic balance, and impact resistance. The laminated body has three or more layers, and has the following (B) layer between two layers of a fiber reinforced resin sheet, (B) layer: A resin sheet in which the displacement, in an S-S curve waveform obtained by the following high-speed punching test, from a peak value of the test force (kN) to an 85%—attenuation value is not less than 22 mm.

(Continued)

High-speed punching test: Impact absorption energy is calculated by using an impact testing machine in compliance with ISO6603-2 standard. A 100 mm×100 mm test piece is cut out from a sheet having a thickness of 2 mm. The diameter of a striker is 12 mm. the diameter of an opening section of a holding tool is 76 mm, and the impact speed is set to 5 m/sec.

15 Claims, 2 Drawing Sheets

(51) Int. Cl.
| | |
|---|---|
| *B32B 27/38* | (2006.01) |
| *B32B 5/28* | (2006.01) |
| *B32B 5/26* | (2006.01) |
| *B32B 27/18* | (2006.01) |
| *B32B 27/40* | (2006.01) |
| *B32B 9/02* | (2006.01) |
| *B32B 27/30* | (2006.01) |
| *B32B 27/28* | (2006.01) |
| *B32B 27/20* | (2006.01) |
| *B32B 27/12* | (2006.01) |
| *B32B 5/12* | (2006.01) |
| *C08J 5/04* | (2006.01) |
| *B32B 27/08* | (2006.01) |
| *B32B 27/32* | (2006.01) |
| *B32B 27/34* | (2006.01) |
| *B32B 37/14* | (2006.01) |
| *C08J 5/24* | (2006.01) |

(52) U.S. Cl.
CPC ............... *B32B 9/02* (2013.01); *B32B 27/08* (2013.01); *B32B 27/12* (2013.01); *B32B 27/18* (2013.01); *B32B 27/20* (2013.01); *B32B 27/285* (2013.01); *B32B 27/286* (2013.01); *B32B 27/302* (2013.01); *B32B 27/306* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *B32B 37/14* (2013.01); *C08J 5/04* (2013.01); *C08J 5/24* (2013.01); *B32B 37/144* (2013.01); *B32B 2250/40* (2013.01); *B32B 2260/023* (2013.01); *B32B 2260/046* (2013.01); *B32B 2262/0253* (2013.01); *B32B 2262/0269* (2013.01); *B32B 2262/0276* (2013.01); *B32B 2262/10* (2013.01); *B32B 2262/101* (2013.01); *B32B 2262/103* (2013.01); *B32B 2262/106* (2013.01); *B32B 2274/00* (2013.01); *B32B 2307/558* (2013.01); *B32B 2307/72* (2013.01); *C08J 2323/12* (2013.01); *C08J 2369/00* (2013.01); *C08J 2377/00* (2013.01)

(56) References Cited

U.S. PATENT DOCUMENTS

| | | |
|---|---|---|
| 2010/0009158 A1 | 1/2010 | Imaizumi et al. |
| 2010/0137516 A1* | 6/2010 | Hert ......................... C08L 77/00 525/66 |
| 2010/0168323 A1* | 7/2010 | Ito ............................ C08F 10/00 524/577 |
| 2010/0206159 A1 | 8/2010 | Wang et al. |
| 2012/0231252 A1* | 9/2012 | Arakawa ................. B32B 5/024 428/219 |
| 2013/0122241 A1* | 5/2013 | Wadahara ............. B29C 43/003 428/114 |
| 2013/0345347 A1* | 12/2013 | Steendam ............... C08L 69/00 524/151 |
| 2014/0186584 A1* | 7/2014 | Arakawa ................. B29C 43/14 428/147 |
| 2016/0016382 A1 | 1/2016 | Ishikawa et al. |

FOREIGN PATENT DOCUMENTS

| | | |
|---|---|---|
| JP | 8-60550 A | 3/1996 |
| JP | 3079546 B2 | 8/2000 |
| JP | 2002-144395 A | 5/2002 |
| JP | 2008-179808 A | 8/2008 |
| JP | 2009-530469 A | 8/2009 |
| JP | 2010-525102 A | 7/2010 |
| JP | 2011-524449 A | 9/2011 |
| JP | 2012-240401 A | 12/2012 |
| JP | 2014-218588 A | 11/2014 |
| WO | WO 2006/028107 A1 | 3/2006 |
| WO | WO 2007/110758 A2 | 10/2007 |
| WO | WO 2007/110758 A3 | 10/2007 |
| WO | WO 2008/127556 A1 | 10/2008 |
| WO | WO 2014/142061 A1 | 9/2014 |
| WO | WO 2015/083707 A1 | 6/2015 |

OTHER PUBLICATIONS

International Search Report dated Jul. 5, 2016 in PCT/JP2016/060957 (with English translation), citing documents AO-AT therein, 4 pages.

Extended European Search Report dated Dec. 21, 2017 in Patent Application No. 16773245.2, citing documents AO, AU and AV therein, 9 pages.

\* cited by examiner

LAMINATE

TECHNICAL FIELD

The present invention relates to carbon-fiber-reinforced plastics and to a fiber-reinforced plastic laminate having excellent balance in impact resistance and moldability, while it is available at lower cost. More specifically, the fiber-reinforced plastic laminate related to the present invention exhibits excellent moldability for it to be molded into a complex shape during a stamp-molding process in a short period of time. Since the laminate is capable of maintaining mechanical characteristics and impact strength when used as a structural member, it is suitable for use in applications such as aircraft parts, automobile parts and sporting goods.

The present application is based upon and claims the benefit of priority to Japanese Application No. 2015-75520, filed Apr. 2, 2015, the entire contents of which are incorporated herein by reference.

BACKGROUND ART

Carbon-fiber-reinforced thermoplastics are made of carbon fibers and thermoplastic resin and exhibit excellent specific strength and specific rigidity. Accordingly, they are used in a wide range of applications such as electrical and electronic devices, civil engineering and construction materials, automobile and aircraft parts and so on. To mold fiber-reinforced thermoplastics, the most commonly employed is a stamp-molding process; that is, forming a laminate of an intermediate substrate known as a prepreg made by impregnating thermoplastic resin into continuous reinforcing fibers, and forming the laminate into a desired shape by hot-pressing with a pressing machine or the like. Since the obtained fiber-reinforced plastics contain continuous reinforcing fibers, they exhibit excellent mechanical characteristics. In addition, when aligned regularly, continuous reinforcing fibers can be designed to have desired mechanical characteristics with smaller variations. Reinforcement of composite materials by using carbon fibers is effective in enhancing their strength and rigidity, but such reinforcement does not contribute much to improving impact resistance. Accordingly, it is necessary to increase the amount of expensive carbon fibers, thereby raising economic issues yet to be solved.

To solve the above-identified problem, proposed is a sandwiched laminate structure formed by laminating a fiber-reinforced composite (skin) on both sides of an inexpensive resin (core) (Patent Literature 1). Such a structure maximizes its lightweight feature while maintaining mechanical characteristics, but impact resistance remains low.

Moreover, numerous studies have been conducted in recent years on forming composite materials of thermoplastic resins and organic long fibers. For example, Patent Literature 2 proposes forming composite materials by using a roller to press aligned organic long fibers into molten thermoplastic resin discharged from an extruder. However, such composite materials are low in strength and elastic modulus, and their impact resistance is not sufficient. In addition, regarding composite materials formed with a rubber or thermoplastic elastomer reinforced by organic fibers, strength and elastic modulus are yet to be improved since the rubber or thermoplastic elastomer as the matrix is soft.

Furthermore, improvements to impact resistance have been studied by making a composite material using thermoplastic resins and natural fibers (for example, Patent Literature 3). Although improvements to impact resistance have been observed, natural fibers are generally low in strength and elastic modulus, while being expensive and having low productivity. Accordingly, there are also economic issues in using natural fibers.

To compensate for the disadvantages of the materials described above, a highly rigid sandwich structure is proposed; the core layer is formed with an impact-absorbing material made of organic fibers and thermoplastic resin while skin layers are made of carbon-fiber-reinforced thermoplastic resin (Patent Literature 4). Since the amount of expensive reinforcing fibers is reduced, such a structure shows better cost performance, but impact resistance is still insufficient. In addition, resin impregnation into carbon fibers in the skin layers is insufficient, causing mechanical characteristics to vary.

CITATION LIST

Patent Literature

Patent Literature 1: WO2006/028107
Patent Literature 2: JP2002-144395A
Patent Literature 3: JP2009-530469A
Patent Literature 4: JP2012-240401A

SUMMARY OF THE INVENTION

Problems to be Solved by the Invention

The objective of the present invention is to solve the aforementioned problems associated with conventional technology, more specifically, to provide a fiber-reinforced plastic laminate which exhibits excellent mechanical characteristics and impact resistance suitable for use as a structural component, and which shows fewer variations in its mechanical characteristics and has excellent moldability so as to be moldable in a shorter period of time at lower cost.

Solutions to the Problems

The inventors of the present invention have conducted intense research to solve the aforementioned problems and found that when a laminate is formed by arranging highly rigid fiber-reinforced resin sheets laminated to be both surface layers and a layer (B) having excellent impact absorption to be in the middle layer, a low-cost carbon-fiber-reinforced plastic laminate is obtained, having excellent balance in mechanical characteristics, impact resistance and moldability. Namely, the present invention has aspects [1] and [15] shown below.

[1] A laminate formed to be at least triple-layered, having a layer (B) specified below between two fiber-reinforced resin sheets:

Layer (B): a resin sheet, having a displacement of 21 mm or greater measured when test force (kN) is attenuated 85% from its peak value in an S-S waveform curve obtained by high-speed puncture testing described below.
(High-speed Puncture Test)

Using an impact tester, impact-absorbing energy is calculated in accordance with the standards in ISO 6603-2. A 100 mm×100 mm test piece is cut out from a 2 mm-thick sheet and test conditions are set to be striker diameter of 12 mm, hole diameter of a pressing jig of 76 mm, and velocity at impact of 5 m/sec.

[2] The laminate according to [1], in which the fiber-reinforced resin sheet is a laminated substrate formed by laminating multiple sheets of a prepreg containing unidirectional reinforcing fibers and a matrix resin, and the laminate is obtained by aligning reinforcing fibers in the prepreg sheets to be quasi-isotropic, or by alternately laminating prepreg sheets in such a way that when the direction of reinforcing fibers in a prepreg sheet is set to be zero degrees, the direction of reinforcing fibers in its adjacent prepreg sheet is set to be 90 degrees.

[3] The laminate according to [1] or [2], in which the total thicknesses of the fiber-reinforced resin sheets are divided by the entire thickness of layer (B), the value is 0.5 to 3.0.

[4] The laminate according to any of [1] to [3], in which the resin in the resin sheet of layer (B) is one type selected from among <1> to <3> below:

<1> a resin mixture formed by adding a thermoplastic elastomer resin with a density of 0.86~0.92 g/cm$^3$ to a polyamide resin;

<2> a resin mixture formed by adding a thermoplastic elastomer resin with a density of 0.86~0.92 g/cm$^3$ to a polypropylene resin;

<3> a polycarbonate resin, in which a melt volume rate (MVR) is 9 cm$^3$/10 min. or lower when measured under conditions of 300° C. and a load of 1.2 kg.

[5] The laminate according to any of [1] to [3], in which the resin in the resin sheet of layer (B) contains a polyamide resin and α-olefin polymer, and the α-olefin polymer is combined at 0~50 parts by weight per 100 parts by weight of the polyamide resin.

[6] The laminate according to any of [1] to [3], in which the resin in the resin sheet in layer (B) contains a polypropylene resin and an elastomer, the elastomer is combined at 0~80 parts by weight per 100 parts by weight of the polypropylene resin, and the elastomer is an ethylene/αolefin copolymer with a density of 0.86~0.92 g/cm$^3$.

[7] The laminate according to any of [1] to [6], in which the fiber-reinforced resin sheet is a laminated substrate formed by laminating multiple sheets of a prepreg containing unidirectional reinforcing fibers and a matrix resin, slits are made in the prepreg at a depth that cuts through the carbon fibers in a transverse direction, the slits are linear, the direction of the slits is set to have an angle of 30~60 degrees relative to the direction of the carbon fibers, and the total length of slits per 1 m$^2$ of a prepreg is 20 m to 250 m.

[8] The laminate according to any of [7], in which the average fiber length of the reinforcing fibers is 10 mm to 50 mm.

[9] The laminate according to any of [1] to [8], in which the volume ratio of reinforcing fibers in the fiber-reinforced resin sheet is 20%~60%.

[10] The laminate according to any of [1] to [9], in which the type of the matrix resin in the fiber-reinforced resin sheet is the same as that of the resin sheet in layer (B).

[11] The laminate according to any of [1] to [10], in which the interlaminar T-peel strength of the laminate is 12 N/15 mm or greater.

[12] The laminate according to any of [1] to [11], in which the reinforcing fibers in the fiber-reinforced resin sheet are carbon fibers.

[13] The laminate according to any of [1] to [12], in which the average single fiber fineness of reinforcing fibers of the fiber-reinforced resin sheet is 0.5 dtex to 2.4 dtex.

[14] The laminate according to any of [1] to [3], in which the number of filaments in a fiber tow used for reinforcing fibers of the fiber-reinforced resin sheet is 3,000 to 100,000.

[15] The laminate according to any of [1] to [14], having a thickness of 2 mm or more, elastic modulus of 20 GPa or higher, and when the impact-absorbing energy calculated by high-speed puncture testing below is divided by the thickness of the laminate, the value is 6.0 J/mm or greater.

High-speed Puncture Test

Using an impact tester, impact-absorbing energy is calculated in accordance with the standards in ISO 6603-2. A 100 mm×100 mm test piece is prepared by cutting it out from the laminate and test conditions are set to be striker diameter of 12 mm, aperture diameter of a pressing jig of 76 mm, and velocity at impact of 5 m/sec. The impact-absorbing energy of the test piece is calculated from the area in the S-S curve obtained by the test.

Effects of the Invention

According to the present invention, a carbon-fiber reinforced plastic laminate is provided to exhibit excellent mechanical characteristics and impact resistance suitable for use as a structural component; since the laminate has excellent moldability and its mechanical characteristics show fewer variations, the laminate is moldable in a short period of time at lower cost.

DETAILED DESCRIPTION OF THE EMBODIMENTS

Figure 1:
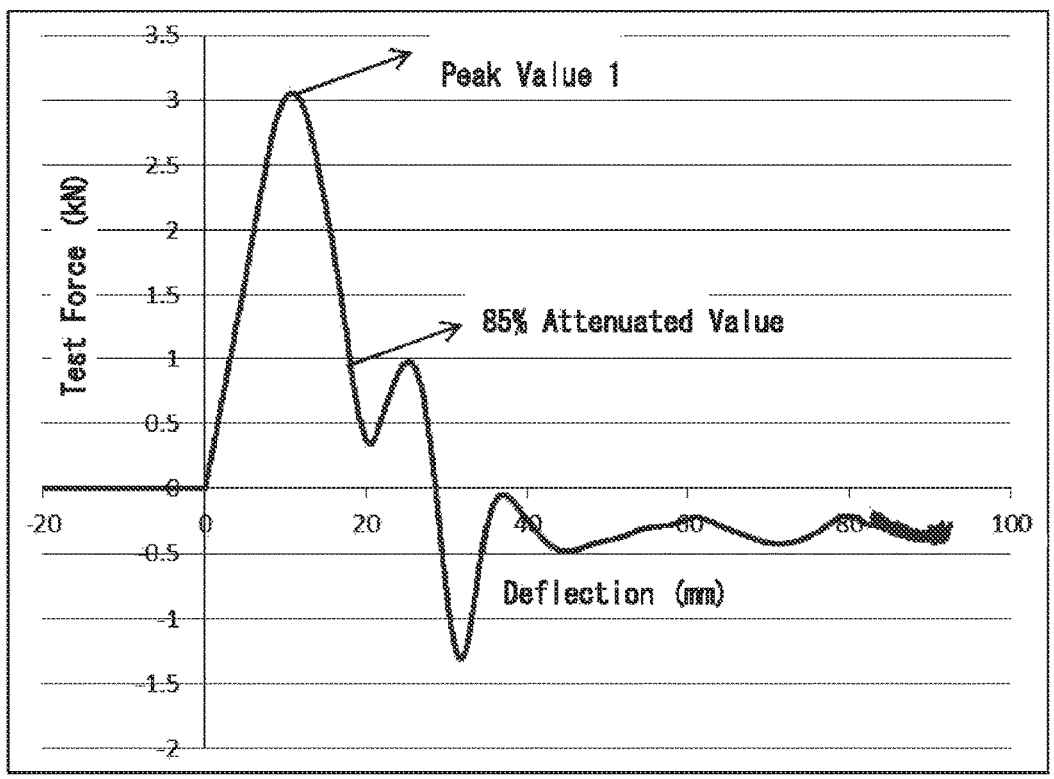
FIG. 1 is a waveform curve graph showing the test force and resulting deflection obtained by high-speed puncture testing in an example of the present invention.

A laminate according to an embodiment of the present invention is characterized by being triple-layered and having a below-described layer (B) disposed between two fiber-reinforced resin sheets.

Layer (B): a resin sheet, having a displacement of 22 mm or greater measured when test force (kN) is attenuated 85% from its peak value in an S-S waveform curve obtained by high-speed puncture testing described below.

(High-speed Puncture Test)

In an embodiment of the present invention, high-speed puncture testing is conducted to calculate impact-absorbing energy in accordance with the standards in ISO 6603-2 using Hydroshot HITS-P10 made by Shimadzu Corporation. A 100 mm×100 mm test piece is cut out from a 2 mm-thick sheet and test conditions are set to be striker diameter of 12 mm, hole diameter of a pressing jig of 76 mm, and velocity at impact of 5 m/sec. An S-S waveform curve is obtained as an output from the Hydroshot HITS-P10 made by Shimadzu when high-speed puncture testing is conducted.

(Fiber-reinforced Resin Sheet)

A fiber-reinforced resin sheet used in a laminate of the present embodiment needs to be a sheet made of unidirectionally aligned planar prepreg, or a random sheet with an arithmetic mean fiber length of 12 mm to 100 mm.

Considering impact resistance, a fiber-reinforced resin sheet is preferred to be a prepreg sheet containing unidirectional reinforcing fibers and a matrix resin, more preferably a laminate of multiple sheets of such a prepreg. From a viewpoint of fluidity, the lamination pattern of prepreg sheets is set in such a way that the reinforcing fibers of the prepreg sheets are oriented to cross each other at an angle of 30 degrees or greater.

The reinforcing fibers in a prepreg are preferred to be 20~60 vol. %, more preferably 30~50 vol. %, from the viewpoint of mechanical strength. To exhibit the effect of enhancing strength and moldability, the thickness of a prepreg is not limited particularly, but it is preferred to be 50~300 μm, more preferably 100~200 μm. Moreover, considering mechanical characteristics and impact resistance, the thickness of a fiber-reinforced resin sheet is preferred to be 0.1~1.5 mm, and the total thickness of two layers of fiber-reinforced resin is preferred to be no greater than 2.5 mm.

To balance impact resistance and moldability, it is preferred to use a sheet containing reinforcing fibers with an arithmetic mean fiber length of 12 mm~100 mm dispersed at random.

The content of reinforcing fibers contained in the sheet is preferred to be 20~60vol. %, more preferably 30~50 vol. %, from the viewpoint of mechanical strength. The thickness of such a sheet is not limited particularly, but is preferred to be 0.1 mm~1.5 mm, and the total thickness of two layers of fiber-reinforced resin is preferred to be no greeter than 2.5 mm.

((Resin Matrix of Fiber-reinforced Resin Sheet))

A resin matrix applicable for the fiber-reinforced resin sheet of the present embodiment is any of thermosetting and thermoplastic resins. Examples of thermosetting resins are epoxy resins, and vinyl ester resins are preferred from the viewpoint of moldability. Examples of thermoplastic resins are styrene resins such as polystyrene, (meth)acrylate/styrene copolymers, acrylonitrile/styrene copolymers, styrene/maleic anhydride copolymers, ABS, ADA and AES; acrylic resins such as polymethyl methacrylate; polycarbonate resins; polyamide resins; polyester resins such as polyethylene terephthalate and polybutylene terephthalate; polyphenylene ether resins; polyoxymethylene resins; polysulfone resins; polyarylate resin; polyphenylene sulfide resins; thermoplastic polyurethane resins; polyolefin resins such as polyethylene, polypropylene, polybutene, poly-4-methylpentene, ethylene/propylene copolymers and ethylene/butene copolymers; copolymers of α-olefin and various monomers such as ethylene/vinyl acetate copolymers, ethylene/(meth)acrylate copolymers, ethylene/maleic anhydride copolymers and ethylene/acrylic acid; aliphatic polyester resins such as polylactic acid, polycaprolactone and aliphatic glycol/aliphatic dicarboxylic acid copolymers; and biodegradable resins such as biodegradable cellulose, polypeptide, polyvinyl alcohol, starch, carrageenan, and chitin-chitosan. In terms of strength and processability, crystalline resins are preferable, more preferably polyamide resins. If applicable, various resin additives may also be combined; for example, colorants, antioxidants, metal deactivators, carbon black, nucleating agents, mold release agents, lubricants, antistatic agents, photostabilizers, UV absorbers, impact modifiers, melt tension improvers, flame retardants and the like.

((Reinforcing Fiber of Fiber-reinforced Resin Sheet))

The types of reinforcing fibers to be used for a prepreg in a fiber-reinforced resin sheet of the present embodiment are not limited particularly, and any of inorganic, organic, metal or hybrid reinforcing fibers formed in combination thereof may be used. Examples of inorganic fibers are carbon fibers, graphite fibers, silicon carbide fibers, alumina fibers, tungsten carbide fibers, boron fibers and glass fibers. Examples of organic fibers are aramid fibers, high-density polyethylene fibers, and commonly used nylon fibers and polyesters. Examples of metal fibers are fibers of stainless steel, iron or the like, and they may be carbon fibers coated with a metal. Considering mechanical characteristics such as strength of the final molded article, carbon fibers are preferred. The average fiber diameter of reinforcing fibers is preferred to be 1~50 μm, more preferably 5~20 μm.

Carbon fibers are not limited to any particular type, and polyacrylonitrile (PAN)-based, petroleum or coal pitch-based, rayon-based, or lignin-based carbon fibers may be used. PAN-based carbon fibers formed using PAN as a raw material are especially preferable since they exhibit excellent mechanical characteristics and industrial-scale productivity. Those listed above are commercially available.

As for a reinforcing fiber two, the total fiber fineness is preferred to be 200~7000 tex. The number of filaments is preferred to be 1,000 or greater, more preferably 3,000 or greater, and preferably 1000,000 or less, more preferably 60,000 or less. Namely, the number of filaments in a reinforcing fiber tow is preferred to be 1000~100,000, more preferably 3,000~60,000. Regarding a carbon-fiber two, its strength if preferred to be 1~10 GPa, more preferably 5~8 GPa, and its elastic modulus is preferred to be 100~1,000 GPa, more preferably 200~600 GPa. The strength and elastic modulus of a reinforcing-fiber tow are those measured by the method specified in ISO 10618.

The single fiber fineness of reinforcing fibers in the present embodiment is not limited specifically, but it is preferred to be 0.5~2.4 dtex from the viewpoint of strength.

Carbon fibers to be used in a laminate and prepreg related to the present embodiment are preferred to be surface-treated, especially electrolyzed. Surface-treating agents are, for example, epoxy-based, urethane-based, nylon-based or olefin-based sizing agents. Surface-treating contributes to enhancing tensile strength and bending strength.

((Method for Producing Prepreg used for Fiber-reinforced Resin Sheet))

(1) When a prepreg used for a fiber-reinforced resin sheet is a thermoplastic prepreg sheet containing unidirectional reinforcing fibers and thermoplastic matrix resin:

A prepreg is formed when a non-woven fabric, film or sheet-type thermoplastic resin is laminated on unidirectional reinforcing fibers, and the laminate is hot-pressed for impregnation. Here, when reinforcing fibers are defined to be unidirectionally oriented, unidirectional, or unidirectionally aligned, the fibers may be aligned to have an angle of 1 degree or less, preferably 0.5 degrees or less, with each other.

A thermoplastic prepreg is formed, for example, when two sheets of film-type thermoplastic resin are prepared, a sheet made of reinforcing fibers is sandwiched between the two sheets, and all the sheets are hot-pressed. More specifically, using two roll feeders, two sheets of thermoplastic resin film are fed out, between which a reinforcing-fiber sheet supplied from another roll is sandwiched, and the laminated sheets are hot-pressed. Any known method is employed for the hot-pressing process; for example, it may entail multi-stages using two or more hot rolls, or multiple pairs of a preliminary heating device and hot rolls. Here, a thermoplastic resin to form a film may not be one type, and it is an option to further laminate a film made of another type of thermoplastic resin using the above device or the like.

The temperature for the heating process above is usually preferred to be set at 100~400° C., depending on the type of thermoplastic resin. The pressure for hot-pressing is usually preferred to be 0.1~10 MPa. Setting in such ranges is preferred for the thermoplastic resin to be impregnated among reinforcing fibers contained in the prepreg. A commercially available prepreg may also be used as the prepreg in a laminated substrate in the present embodiment.

Regarding the prepreg containing reinforcing fibers and thermoplastic resin composition for forming fiber-reinforced resin sheet of the present embodiment, to enhance the balance of moldability and mechanical characteristics of carbon-fiber-reinforced plastic laminate, slits may be formed to have a depth that cuts through the reinforcing fiber in a transverse direction. In order to enhance the balance of moldability and mechanical characteristics of carbon-fiber-reinforced plastic laminate, the slits are preferred to be made at an angle θ of no greater than 60 degrees, more preferably 30~60 degrees, relative to the direction of reinforcing fibers. In addition, the total length (la) of slits per 1 $m^2$ of prepreg is preferred to be 20 m or more, but 250 m or less, more preferably 150 m or less, even more preferably 100 m or less.

is formed to have the same angle in a fiber to cut in the same length

The shape of slits does not have to be linear. If curved slits are made at the same angle in fibers to be cut to the same length as above, the total length (la) of slits per 1 $m^2$ of a prepreg is made loner. Accordingly, moldability is expected to be enhanced while high mechanical characteristics are maintained.

Regarding the prepreg contained in the laminated substrate of the present embodiment, the length (L) of cut reinforcing fibers is not limited particularly, but it is preferred to be 5 mm to 100 mm from the viewpoint of mechanical characteristics and fluidity. Especially, to provide both sufficient mechanical characteristics and fluidity for thinner areas such as ribs during the stamp-molding process, the length is preferred to be 10 mm to 50 mm.

Slits in the prepreg used in the present embodiment may be formed by using a laser marker, cutting plotter, cutting die or the like. Making slits using a laser marker is preferred since complex slits such as curved or zigzagged slits are formed at high speed. Alternatively, making slits using a cutting plotter is preferred since it is easier to perform the process on a large-size prepreg of 2 meters or greater, whereas making slits using a cutting die is preferable since a cutting die is capable of processing at high speed.

((Lamination pattern of prepreg in fiber-reinforced resin sheet when the prepreg is a sheet-type containing unidirectional reinforcing fibers and matrix resin))

In a fiber-reinforced resin sheet of the present embodiment, a prepreg laminate containing reinforcing fibers and a matrix resin is preferred to be formed by laminating multiple prepreg sheets in such a way that reinforcing fibers in the prepreg sheets are aligned in a quasi-isotropic direction to minimize anisotropic features of the laminate.

To minimize anisotropic features and increase impact-absorbing energy in the prepreg laminate that contains carbon fibers and thermoplastic resin composition and is used as a layer (A) of the embodiment, prepreg sheets are preferred to be laminated alternately in such a way that when the direction of reinforcing fibers in a prepreg is set to be zero degrees, the direction of reinforcing fibers in its adjacent prepreg is set at 90 degrees. Here, the angle set at 90 degrees as the direction of reinforcing fibers in a prepreg relative to the direction of reinforcing fibers in its adjacent prepreg set at zero degrees means substantially 90 degrees. The angle made by adjacent reinforcing fibers in a prepreg may be set at approximately ±1 degree, preferably ±0.5 degrees, while the angle made by reinforcing fibers in adjacent sheets of prepreg may be set at approximately 90±1 degrees, preferably 90±0.5 degrees.

(When reinforcing-fiber sheet is a random material)

When a sheet to be used as the fiber-reinforced resin sheet of the present embodiment is formed by dispersing reinforcing fibers at random, the arithmetic mean fiber length is preferred to be 12~100 mm from the viewpoints of mechanical characteristics and moldability.

(Layer (B))

The resin sheet to be used as a layer (B) in the present embodiment is defined as follows: a resin sheet, having a deflection of 21 mm or greater measured when test force is attenuated 85% from its peak value in a waveform curve showing test force (kN) and displacement (mm) obtained by high-speed puncture testing described below.

Since a smaller displacement reduces impact resistance, the displacement is preferred to be 22 mm or greater. The upper limit of the displacement value is not limited specifically, but it is usually no greater than 30 mm from the viewpoint of rigidity.

(High-speed Puncture Test)

As an impact tester, Hydroshot HITS-P10, made by Shimadzu Corporation is used to calculate impact-absorbing energy in accordance with the standards in ISO 6603-2. A 100 mm×100 mm test piece is cut out from a 2 mm-thick sheet and test conditions are set to be striker diameter of 12 mm, hole diameter of pressing jig of 76 mm and velocity at impact of 5 m/sec.

In a waveform curve showing the test force (kN) and displacement (mm) (FIG. 1) obtained in the above high-speed puncture test, the value of displacement was calculated when the test force is attenuated 85% from its peak value 1.

Examples of resin for forming a resin sheet of a layer (B) use din the present embodiment are styrene resins such as polystyrene, (meth)acrylate/styrene copolymers, acrylonitrile/styrene copolymers, styrene/maleic anhydride copolymers, ABS, ASA and AES; acrylic resins such a methyl polymethacrylate; polycarbonate resins; polyamide resins, polyester resins such a polyethylene terephthalate and polybutylene terephthalate; polyphenylene ether resins; polyoxymethylene resins; polysulfone resins; polyarylate resins; polyphenylene sulfide resins; thermoplastic polyurethane resins; polyolefin resins such as polyethylene, polypropylene, polybutene, poly-4-methylpentene, ethylene/propylene copolymers and ethylene/butene copolymers; copolymers of α-olefin and various monomers such as ethylene/vinyl acetate copolymers, ethylene/(meth)acrylate copolymers, ethylene/maleic anhydride copolymers and ethylene/acrylic acid copolymer; aliphatic polyester resins such as polylactic acid, polycaprolactone and aliphatic glycol/aliphatic dicarboxylic acid copolymers; and biodegradable resins such as biodegradable cellulose, polypeptide, polyvinyl alcohol, starch, carrageenan, and chitin•chitosan. Considering impact absorption characteristics and surface appearance after being processed, especially preferred are resins selected from among polyamide resins, polypropylene resins, polycarbonate resins, polyester resins, ABS resins, copolymers of two or more components of such polymers, and resins obtained by combining an elastomer component with those listed above. The resin for the resin sheet of a layer (B) is preferred to contain a resin mixture prepared by combining two or more resins listed above. The resin for the resin sheet of a layer (B) is preferred to contain a resin mixture prepared by combining two or more resins listed above.

The elastomer components to be combined in the thermoplastic resin in layer (B) used in the present embodiment are resins, for example, ethylene-acrylate copolymers, ethylene-vinyl acetate copolymers, ethylene-acrylonitrile copolymers, ethylene-propylene copolymer elastomers, ethylene-propylene-diene copolymer elastomers, ethylene-octene copolymer elastomers, ethylene-hexene copolymer elastomers, ethylene-octene copolymer elastomers propylene-ethylene copolymer elastomers or plastomers, natural rubbers, diene rubbers, chloroprene rubbers, nitrile rubbers, polysaccharides, natural resins, and the like. From the viewpoint of impact absorption characteristics, it is preferred to select an elastomer component with a density of 0.86~0.92 g/cm$^3$, and it is especially preferred to use a thermoplastic elastomer component. Considering the balance of rigidity and impact adsorption characteristics, it is preferred to combine an elastomer component approximately at 1~80 parts by weight per 100 parts by weight of the propylene thermoplastic composition.

If applicable, various resin additives may also be combines; for example, colorants, antioxidants, metal deactivators, carbon black, nucleating agents, mold release agents, lubricants, antistatic agents, photostabilizers, UV absorbers, anti-shock modifiers, melt tension improvers, flame retardants and the like.

A commercially available product may be used for the resin sheet of a layer (B) in the present embodiment. It may be, for example, a polyamide resin, 1018I T-222SA or TY-102 made by Toyobo Co., Ltd., or the like (all refer to their respective product names).

Considering the balance of rigidity and impact absorption characteristics, a layer (B) of the present embodiment is preferred to be made of a polyamide resin and an ethylene-butene copolymer; relative to 100 parts by weight of polyamide resin, it is preferred that 0~50 parts by weight of ethylene-butene copolymer be combined, and relative to 100 parts by weight of polyamide resin, it is preferred that 1~50 parts by weight of ethylene-butene copolymer be combined.

(Laminate)

The laminate of the present embodiment is preferred to have a value of 0.5~3.0, more preferably 0.3~2, when the value of the total thicknesses of the fiber-reinforced resin sheets is divided by the value of the entire thickness of layer (B). An excessively large value decreases impact resistance, and an excessively small value fails to achieve sufficient strength and rigidity.

The laminate of the present embodiment is basically a triple-layered laminate made of a fiber-reinforced resin sheet/layer (B)/fiber-reinforced resin sheet. Within a range that does not significantly inhibit the effects of the present embodiment, the laminate may have other layers such as a gas-barrier layer in addition to fiber-reinforced resin sheets and layer (B), if applicable.

When a laminate includes a layer other than fiber-reinforced resin sheets and a layer (B), it is preferred to laminate fiber-reinforced resin sheets on both of the surface layers of the laminate form a rigidity point of view. However, a coating layer or the like may be laminated on the outer side of a fiber-reinforced resin sheet to enhance appearance, unless such a layer significantly inhibits the effects of the present embodiment.

The laminate of the present embodiment is preferred to have an interlaminar T-peel strength of 12 N/15 mm or greater. Since insufficient interlaminar T-peel strength reduces impact resistance strength, it is preferred to be 10N/15 mm or greater. No specific upper limit is set for the interlaminar T-peel strength. Usually, it is preferred to use similar interlaminar resins, and their T-peel strength is 15 N/15 mm or greater.

The laminate of the present embodiment has a thickness of 2 mm or more, an elastic modulus of 20 GPa or higher, and a value of 4 J/mm or higher obtained when the impact-absorbing energy of the laminate calculated in the high-speed puncture test below is divided by the thickness of the laminate. Too low a value causes insufficient impact resistance; it is preferred to be 7.5/mm or higher. There is not particular upper limit, but the value is usually 7.5/mm or lower, preferably 15 mm or lower.

(High-speed Puncture Test)

Figure 2:
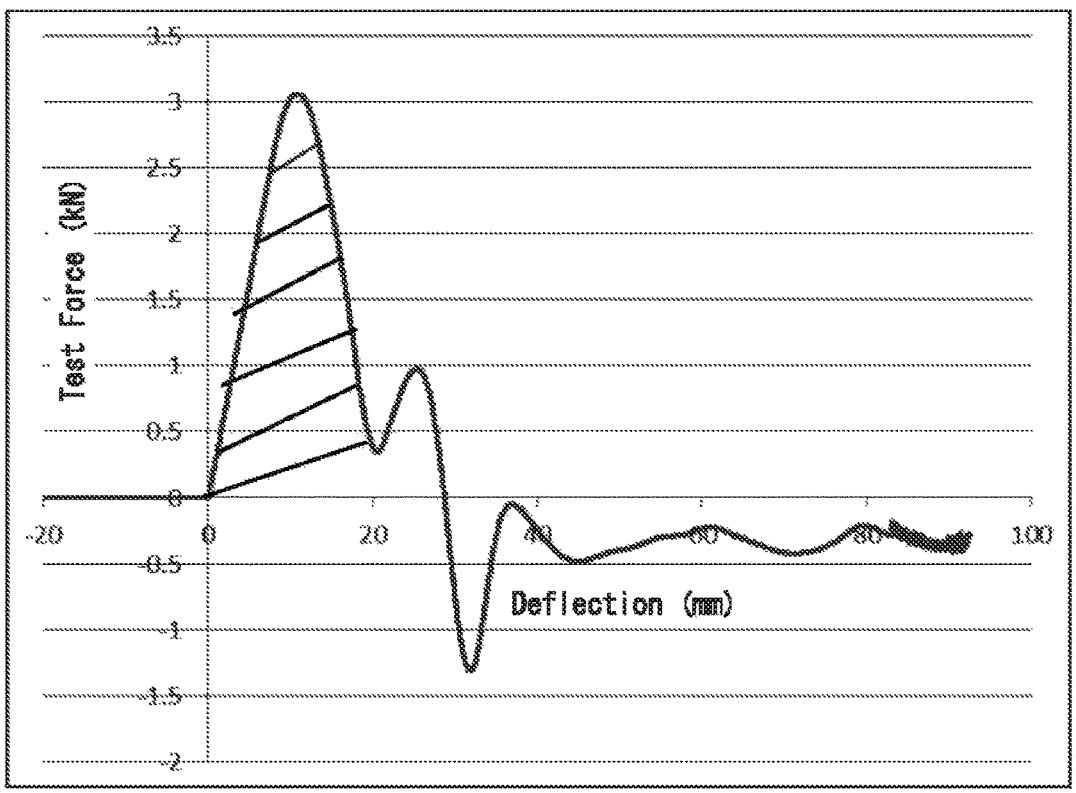
FIG. 2 is a graph showing how to determine the impact-absorbing energy of a test piece from the waveform curve shown in FIG. 1.

Hydroshot HITS-P10 made by Shimadzu Corporation is used to calculate impact-absorbing energy in accordance with the standards in ISO 6603-2. A 100 mm×100 mm test piece is cut out and test conditions are set to be striker diameter of 12 mm, hole diameter of pressing jig of 76 mm, and velocity at impact of 5 m/sec. From the area indicated by diagonal lines in a curve showing the test force (kN) and displacement (mm) obtained by the test (FIG. 2), the impact-absorbing energy of the test piece is calculated.

(Method for Producing Laminate)

A laminate is obtained by hot-pressing a layer (B) at or above its softening or melting point so as to be integrated with a sheet (A), formed with a prepreg containing reinforcing fibers and a thermoplastic resin composition or prepared by dispersing at random reinforcing fibers with an arithmetic mean fiber length of 12~100 mm.

More specifically, a generally used apparatus such as a hot-pressing machine may be used for the above process, including a die with a desired shape. The material of the die may be any type normally used for hot-stamp molding, for example, a metallic die. The present step is conducted by disposing a laminate in a die, and hot-pressing the laminate, for example.

Depending on the type of thermoplastic resin in the laminate, heat is preferred to be applied at 100~400° C., more preferably at 150~350° C. In addition, prior to applying heat, preliminary heating may also be employed. Preliminary heating is usually preferred to be conducted at 150~400° C., more preferably 200~380° C.

The pressure to be exerted on a laminate during the pressing process is preferred to be 0.1~10 MPa, more preferably 0.2~2 MPa. The value is set by dividing the pressing force by the area of laminate.

The time for heating and pressing is preferred to be 0.1~30 minutes, more preferably 0.5~10 minutes. In addition, the cooling time after the hot-pressing process is preferred to be 0.5~30 minutes.

When a carbon-fiber-reinforced thermoplastic laminate of the present embodiment is integrated after the hot-stamp molding, its thickness is preferred to be 0.5~10 mm.

The above hot-pressing process may be conducted with lubricant present between the die and the laminate. Because of the lubricant, the fluidity of carbon fibers contained in the prepreg of the laminated substrate is increased during the hot-pressing process. Accordingly, impregnation of thermoplastic resin into carbon fibers is facilitated, thus reducing voids among carbon fibers and between carbon fibers and thermoplastic resin observed in the obtained laminate.

Examples of a lubricant are silicone-based and fluorine-based lubricants and lubricants in combination thereof. Preferred silicone-based lubricants are heat-resistant types that can be used in high temperature environments. More specific examples are silicone oils such as methyl phenyl silicone oil and dimethyl silicone oil, and commercially available ones are preferably employed. Preferred fluorine-based lubricants are heat-resistant types that can be used in high temperature environments. Specific examples are fluorine oils such as perfluoropolyether oil or lower polychlorotrifluoroethylene (weight-average molecular weight of 500 to 1300) and the like.

The above lubricant may be applied on either or both surfaces of the laminate, either or both surfaces of the die, or either or both surfaces of the laminate and the die by taking an appropriate measure using a lubricant applicator or the like. Alternatively, the lubricant may be coated in advance on the surfaces of a die. Among those options, it is preferred to apply a lubricant on both surfaces of the laminate.

EXAMPLES

In the following, the present invention is described in further detail by referring to the examples below. However, the present invention is not limited to those examples.
(Displacement measured when test force (kN) is attenuated 85% from its peak value in an S-S waveform curve obtained in high-speed puncture testing below)

In a waveform curve showing the test force (kN) and displacement (mm) obtained in the high-speed puncture test below (FIG. 1), when test force is attenuated 85% from its peak value 1, the displacement of peak value was calculated.
(High-speed Puncture Test)

Hydroshot HITS-P10 made by Shimadzu Corporation is used to calculate impact-absorbing energy in accordance with the standards in ISO 6603-2. A 100 mm×100 mm test piece is cut out from a 2-mm thick sheet and test conditions are set to be striker diameter of 12 mm, hole diameter of pressing jig of 76 mm, and velocity at impact of 5 m/sec.
(Evaluation of Mechanical Characteristics)

from the laminate, a test piece was cut out in a size 100 mm long and 25 mm wide to have an angle of zero degrees relative to the fiber orientation direction. To determine flexural strength and flexural modulus, a three-point bending test was conducted using a universal testing machine (product name: Model 4465, made by Instron Corporation) and by setting the diameter of the indenter at 5 mm, diameter of a supporting point at 2 mm, distance between the indicator marks at 80 mm, and crosshead speed at 5.0 mm/min. If the laminate resulted in a flexural modulus of 20 GPa or greater, it was evaluated as "○"; the result was less than 20 GPa, the laminate was evaluated as "×",
(Evaluation of Impact Resistance)

The impact resistance was determined by the value obtained when the impact-absorbing energy calculated by high-speed puncture testing below is divided by the thickness of the laminate. The impact resistance was compared between a sheet (X) formed using only a layer (A) and having a carbon fiber volume ratio (Vf) of 34% and a sheet (Y) formed using layers (A) and (B) and having a carbon fiber volume ration (Vf) of 17%. When the impact resistance of (Y) exceeded that of (X), it was evaluated as "○"; when the impact resistance of (Y) was equal to that of (X), it was evaluated as "Δ"; and when the impact resistance of (Y) was less than that of (X), it was evaluated as "×".
(High-speed Puncture Test)

Hydroshot HITS-P10 made by Shimadzu Corporation is used to calculate impact-absorbing energy in accordance with the standards in ISO 6603-2. A 100 mm×100 mm test piece is cut out and test conditions are set to be striker diameter of 12 mm, hole diameter of pressing jig of 76 mm, and velocity at impact of 5 m/sec. From the area indicated by diagonal lines in a curve showing the test force (kN) and displacement (mm) obtained by the test (FIG. 2), the impact-absorbing energy of the test piece is calculated.

(Interlaminar T-peel Strength)

Interlaminar T-peel strength (N/15 mm) was determined when layers were peeled by setting the peel angle at 90 degrees, peel rate at 300 mm/min, and test width at 15 mm. When interlaminar peeling is observed, if there is no interface peeling but substrate failure occurs, it is denoted as substrate failure since interlaminar adhesive strength is sufficient and it is difficult to measure peel strength.

Example 1

(Producing Prepreg)

A reinforcing-fiber sheet was prepared to have a basis weight of 72.0 g/m$^2$ by unidirectionally aligning carbon fibers (Pyrofil TR-50S 15L, made by Mitsubishi Rayon, Co., Ltd.) into a planar shape. Both surfaces of the reinforcing-fiber sheet were covered with Nylon 6 film (product name: 1013B, thickness: 40 μm, made by Ube Industries, Ltd.), and the laminate was passed through calender rolls multiple times so as to impregnate the thermoplastic resin into the reinforcing-fiber volume ratio (Vf) of 34% and a thickness of 0.125 mm.

The prepreg was cut out into a 300-mm square, into which slits specified in Table 1 were made at a constant interval using a sample cutter (product name: L-2500, made by Laserck Corporation). During that time, except for portions 5 mm inward from the edges of the sheet, slits were formed in the prepreg so that reinforcing fibers had a constant length L=25.0 mm and an average slit length l=14.1 mm by setting the direction of slits that cut into fibers at angle θ=45 degrees relative to the reinforcing fibers. Accordingly, a prepreg (hereinafter abbreviated as PPG) was obtained and the total length (la) of slits per 1 m$^2$ was 56.6 m.

Next, the prepreg with slits was cut out to have a size of 300 mm square, and the PPG was set in a 300 mm-square× 2.0 mm-deep core/cavity die, and laminated as specified in Table 1 with a 1.0 mm-thick tough nylon sheet (product name: 1018I, tough nylon, made by Ube Industries, Ltd.). By using a press-molding machine (product name: SFA-50HH0, made by Shinto Metal Industries Corporation), the laminate was hot-pressed in the high-temperature press at 250° C. for 7 minutes by setting a pressure of zero MPa at the hydraulic gauge, and was further processed at the same temperature for 7 minutes by setting a pressure of 2 MPa at the hydraulic gauge (pressure at the press: 0.55 MPa). Them, the die was transferred to a cooling press and kept there at 30° C. for 3 minutes by setting a pressure of 5 MPa at the hydraulic gauge (pressure at the press: 1.38 MPa). Accordingly, a carbon-fiber reinforced plastic laminate was obtained to have a carbon fiber volume ratio (Vf) of 17%.

Various evaluations were conducted on a test piece cut out of the sheet.

Comparative Example 1

A carbon-fiber-reinforced plastic laminate with a carbon-fiber volume ratio (Vf) of 17% was prepared by employing the same method as in Example 1 except that a 1.0 mm-thick nylon 6 sheet (product name: 1013B, made by Ube Industries, Ltd.) was used. Evaluations were conducted accordingly.
(Carbon-fiber-reinforced Sheet Formed only with Layer (A))

A carbon-fiber-reinforced plastic laminate with a carbon-fiber volume ratio (Vf) of 34% was prepared by employing the same method as in Example 1 except that PPG sheets with slits formed as specified in Table 1 were laminated in a 300 mm-square×2.0 mm-deep core/cavity die. Evaluations were conducted accordingly.

nated into the reinforcing-fiber sheet. Accordingly, a 0.125 mm-thick prepreg was obtained to have a carbon-fiber volume ratio (Vf) of 34%.

TABLE I

|  |  | Example 1 | Comp. Example 1 | Layer (A) only |
|---|---|---|---|---|
| Structure of PPG | slit angle θ (°) | 45 | 45 | 45 |
|  | total length la (m) of slits per 1 m² | 56.6 | 56.6 | 56.6 |
|  | fiber length L (mm) | 25 | 25 | 25 |
|  | average slit length l (/m²) | 14.1 | 14.1 | 14.1 |
| Layer structure of laminate | surface layer | PPG (0°) | PPG (0°) | PPG (0°) |
|  |  | PPG (90°) | PPG (90°) | PPG (90°) |
|  |  | PPG (0°) | PPG (0°) | PPG (0°) |
|  |  | PPG (90°) | PPG (90°) | PPG (90°) |
|  |  |  |  | PPG (0°) |
|  | middle layer | 1018I (1.0 mm) | 1013B (1.0 mm) | PPG (90°) |
|  |  |  |  | PPG (0°) |
|  |  |  |  | PPG (90°) |
|  |  |  |  | PPG (90°) |
|  |  |  |  | PPG (0°) |
|  |  |  |  | PPG (90°) |
|  | surface layer |  |  | PPG (0°) |
|  |  | PPG (90°) | PPG (90°) | PPG (90°) |
|  |  | PPG (0°) | PPG (0°) | PPG (0°) |
|  |  | PPG (90°) | PPG (90°) | PPG (90°) |
|  |  | PPG (0°) | PPG (0°) | PPG (0°) |
| Entire thickness of laminate (mm) |  | 2 | 2 | 2 |
| Average Vt of laminate (%) |  | 17 | 17 | 34 |
| (Both surface layers)/middle layer |  | 1 | 1 |  |
| Interlaminar T-peel strength (N/15 mm) |  | substrate failure | substrate failure |  |
| Deflection of layer (B) when test force is attenuated 85% from peak value |  | 24 | 20 |  |
| High-speed puncture test | Impact-absorbing energy (J) | 18 | 14 | 17 |
|  | Evaluation | ○ | X |  |
| Bending test | 0° flexural strength (MPa) | 384 | 390 |  |
|  | 0° flexural modulus (GPa) | 32 | 33 |  |
|  | Evaluation | ○ | ○ |  |

* "θ" in PPG (θ°) means the orientation angle of reinforcing fibers.

As shown in Table 1, Example 1 exhibited excellent impact resistance and mechanical characteristics. Especially, Example 1 shows significantly greater impact resistance than Comparative Example 1, proving that it is suitable for use as a structural component.

Example 2

(Preparing Matrix Resin)

Using a super mixer, 80 parts by weight of polycarbonate resin pellets (product name: Iupilon H4000, made by Mitsubishi Engineering Plastics Corporation) and 20 parts by weight of polyester resin pellets (product name: Novaduran 5010R5, made by Mitsubishi Engineering Plastics) were dry-blended and put into an extruder with a screw diameter of 30 mm to plasticize the resin by hot-melting it at a temperature of 270° C. A sheet, obtained by extruding the plasticized mixture through T-shaped dies, was sandwiched between mirror-finished metal casting rolls at a constant surface temperature of 20° C. While being cooled and solidified, the sheet was continuously pulled at a rate of 1 m/min. and a 300 mm-wide 40 μm-thick film was obtained.

(Preparing Prepreg)

A reinforcing-fiber sheet with a basis weight of 72.0 g/m² was prepared by unidirectional aligning carbon fibers (product name: Pyrofil TR-50S I5L, made by Mitsubishi Rayon, Co., Ltd.) into a planar shape. Both surfaces of the reinforcing-fiber sheet were covered with the above polycarbonate film (thickness: 40 μm), and passed through calender rolls multiple times so that the thermoplastic resin was impregnated into the reinforcing-fiber sheet. Accordingly, a 0.125 mm-thick prepreg was obtained to have a carbon-fiber volume ratio (Vf) of 34%.

The prepreg was cut out into a 300-mm square, into which slits specified in Table 1 were formed at a constant interval using a sample cutter (product name: L-2500, made by Laserck Corporation). During that time, except for portions 5 mm inward from the edges of the sheet, slits were formed in the prepreg so that reinforcing fibers had a constant length L=25.0 mm and an average slit length l=14.1 mm by setting the direction of slits that cut into fibers at angle θ=45 degrees relative to the reinforcing fibers. Accordingly, a prepreg (hereinafter abbreviated as PPG) was obtained and the total length (la) of slits per 1 m² was 56.6 m.

Next, the prepreg with slits was cut into a 300 mm square, and the PPG was set in a 300 mm-square×2.0 mm-deep core/cavity die, and laminated as specified in Table 1 with a 1.0 mm-thick polycarbonate sheet (product name: Iupilon S-2000, made by Mitsubishi Engineering Plastics Corporation). By using a press-molding machine (product name: SFA-50HH0, made by Shinto Metal Industries Corporation), the laminate was hot-pressed in the high-temperature press at 260° C. for 7 minutes by setting a pressure of zero MPa at the hydraulic gauge, and was further processed at the same temperature for 7 minutes by setting a pressure of 2 MPa at the hydraulic gauge (pressure at the press: 0.55 MPa). Then, the die was transferred to a cooling press and kept there at 30° C. for 3 minutes by setting a pressure of 5 MPa at the hydraulic gauge (pressure at the press: 1.38 MPa). Accordingly, a carbon-fiber-reinforced plastic laminate was obtained to have a carbon fiber volume ratio (Vf) of 17%.

Evaluations were conducted on a test piece cut out of the sheet.

Comparative Example 2

A carbon-fiber-reinforced plastic laminate with a carbon fiber volume ratio (Vf) of 17% was prepared by employing the same method as in Example 1 except that a 1.0 mm-thick polycarbonate sheet (product name: Novarex 7020J, made by Mitsubishi Engineering Plastics Corporation) was used. Evaluations were conducted accordingly.

Carbon-fiber-reinforced Sheet Formed only with Layer (A))

A carbon-fiber-reinforced plastic laminate with a carbon fiber volume ratio (Vf) of 34% was prepared by employing the same method as in Example 1 except that PPG sheets with slits formed as specified in Table 2 were laminated in a 300 mm-square×2.0 mm-deep core/cavity die. Evaluations were conducted accordingly.

fiber sheet. Accordingly, 0.125 mm-thick prepreg was obtained to have a carbon-fiber volume ratio (Vf) of 34%.

A 300-mm square was cut out from the prepreg, and slits specified in Table 1 were formed at a constant interval using a sample cutter (product name: L-2500, made by Laserck Corporation). During that time, except for portions 5 mm inward from the edges of the sheet, slits were formed in the prepreg so that reinforcing fibers had a constant length L=25.0 mm and an average slit length l=14.1 mm by setting the direction of slits that cut into fibers at angle θ=45 degrees relative to the reinforcing fibers. Accordingly, a prepreg (hereinafter abbreviated as PPG) was obtained and the total length (la) of slits per 1 $m^2$ was 56.6 m.

TABLE 2

| | | Example 2 | Comp. Example 2 | Layer (A) only |
|---|---|---|---|---|
| Structure of PPG | slit angle θ (°) | 45 | 45 | 45 |
| | total length la (m) of slits per 1 $m^2$ | 56.6 | 56.6 | 56.6 |
| | fiber length L (mm) | 25 | 25 | 25 |
| | average slit length l (/$m^2$) | 14.1 | 14.1 | 14.1 |
| Layer structure of laminate | surface layer | PPG (0°) PPG (90°) PPG (0°) PPG (90°) | PPG (0°) PPG (90°) PPG (0°) PPG (90°) | PPG (0°) PPG (90°) PPG (0°) PPG (90°) PPG (0°) |
| | middle layer | S-2000 (1.0 mm) | 7020J (1.0 mm) | PPG (90°) PPG (0°) PPG (90°) PPG (0°) PPG (90°) PPG (0°) PPG (90°) |
| | surface layer | PPG (90°) PPG (0°) PPG (90°) PPG (0°) | PPG (90°) PPG (0°) PPG (90°) PPG (0°) | PPG (0°) PPG (90°) PPG (0°) PPG (90°) PPG (0°) |
| Entire thickness of laminate (mm) | | 2 | 2 | 2 |
| Average Vt of laminate (%) | | 17 | 17 | 34 |
| (Both surface layers)/middle layer | | 1 | 1 | |
| Interlaminar T-peel strength (N/15 mm) | | interlaminar peel | interlaminar peel | |
| Deflection of layer (B) when test force is attenuated 85% from peak value | | 21 | 19 | |
| High-speed puncture test | Impact-absorbing energy (J) | 17 | 11 | 17 |
| | Evaluation | ○ | X | |
| Bending test | 0° flexural strength (MPa) | 220 | 210 | |
| | 0° flexural modulus (GPa) | 29 | 27 | |
| | Evaluation | ○ | ○ | |

* "θ" in PPG (θ°) means the orientation angle of reinforcing fibers.

As shown in Table 2, Example 2 exhibited excellent impact resistance and mechanical characteristics. Especially, Example 2 shows significantly greater impact resistance than Comparative Example 2, proving that it is suitable for use as a structural component.

Example 3

(Preparing Prepreg)

A reinforcing-fiber sheet with a basis weight of 72.0 g/$m^2$ was prepared by aligning carbon fibers (product name: Pyrofil TR-50S 15L, made by Mitsubishi Rayon, Co., Ltd.) to be unidirectional in a planar shape. Both surfaces of the reinforcing-fiber sheet were covered with acid-modified polypropylene film (product name: Modic P958V, made by Mitsubishi Chemical Corporation, thickness: 40 μm), and passed through calender rolls multiple times so that the thermoplastic resin was impregnated into the reinforcing- (Forming Carbon-fiber-reinforced Random Sheet)

After slits were made, a prepreg laminate was prepared by laminating four sheets of the prepreg substrate by aligning fiber axes of reinforcing fibers in the same direction. The thickness of the prepreg laminate was 0.5 mm.

Figure 3:
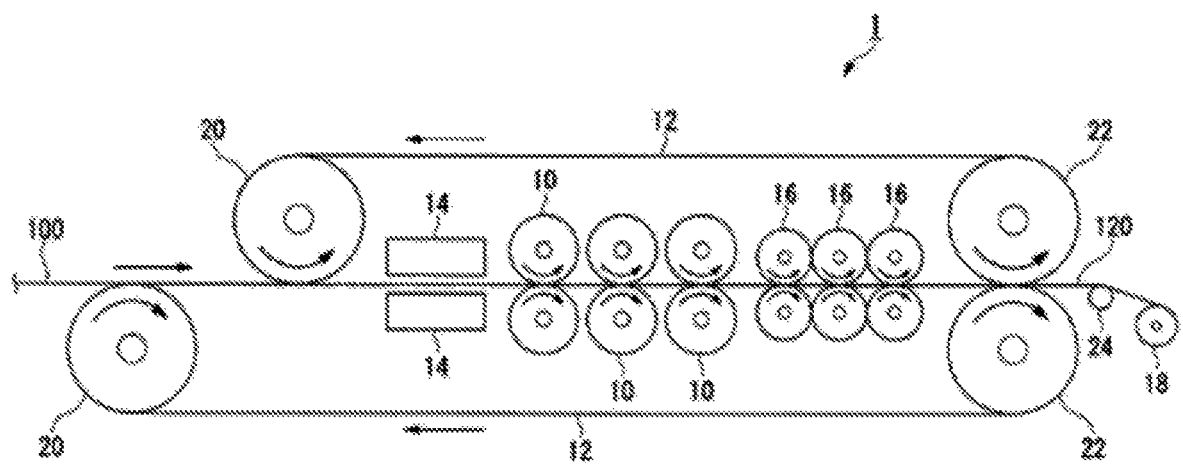
FIG. 3 is a view schematically showing a double-belt hot-pressing machine in an example of the present invention.

Next, the prepreg laminate was pressed by using a double-belt hot-pressing machine 1 as shown in FIG. 3. Hot-pressing machine 1 is structured to have paired belts 12 that vertically sandwich and move belt-shaped prepreg laminate 100 in one direction, paired IR heaters 14 for preliminary heating of prepreg laminate 100, three sets of paired press rolls 10 that vertically sandwich and pressurize preheated prepreg laminate 100, three sets of paired hot-water rolls 16 that vertically sandwich and cool prepreg laminate 100 that was pressed at press-roll 10, and haul-off roll 18 for pulling through guide roll 24 fiber-reinforced plastic 120 formed when prepreg substrates were cooled and solidified for integration. Paired press rolls 10 pressurize prepreg laminate 100 while rotating to send the laminate that passed through the rolls in a direction toward the downstream side. Paired hot-water rolls 16 cool prepreg laminate 100 while rotating to send the laminate that passes through the rolls in a direction toward the downstream side. Fiber-reinforced plastic 120 obtained by cooling prepreg laminate 100 is pulled by haul-off roll 18 through guide roll 24. The present embodiment used double-belt hot-pressing machine 1 as shown in FIG. 3 equipped with vertically arranged belts 12 that run at a rate of 1.0 m/min. The prepreg laminate 100 was put into hot-pressing machine 1 by aligning the fiber axes in prepreg substrate 100 at an angle θ of zero degrees relative to the direction perpendicular to the running direction of the test piece. When set in double-belt hot-pressing machine 1, prepreg laminate 100 was heated to melt the thermoplastic resin and pressed by press rolls 10 that were set to have a roll temperature of 270° C. and a linear load of 10.7 N/m. Then, the laminate was passed through the 1.5 m-long cooling section equipped with hot-water rolls that were set to have a roll temperature of 30° C. and a linear load of 2.5 N/m so that the thermoplastic resin in prepreg laminate 100 was solidified. Accordingly, 0.5 mm-thick fiber-reinforced plastic random sheet 120 was obtained to have a carbon-fiber volume ratio (Vf) of 34%.

(Preparing Polypropylene Resin Sheet)

Using a super mixer, 40 parts by weight of polypropylene resin pellets (product name: WELNEX RFG4VA, made by Japan Polypropylene Corporation), 40 parts by weight of propylene/α-olefin copolymer pellets (product name: VM3000, made by Vistamaxx) and 20 parts by weight of ethylene/hexane copolymer pellets formed through metallocene catalysis (product name: KS260, made by Japan Polyethylene Corporation) were dry-blended and put into an extruder with a screw diameter of 30 mm to plasticize the resin by hot-melting it at a temperature of 200° C. A sheet, formed by extruding the plasticized mixture through T-shaped dies, was sandwiched between mirror-finished metallic casting rolls set to have a constant surface temperature of 20° C. While being cooled and solidified, the sheet was continuously hauled off at a rate of 1 m/min. and a 300 mm-wide, 1.0 mm-thick sheet was obtained.

Next, a 300-mm square was cut out from each of the obtained sheets, and laminated as specified in Table 3 in a 300 mm-square×2.0 mm-deep core/cavity die and heated. By using a compression-molding machine (product name: SFA-50HH0, made by Shinto Metal Industries Corporation), the laminate was hot-pressed in the high-temperature press at 230° C. for 7 minutes by setting a pressure of zero MPa at the hydraulic gauge, and was further processed at the same temperature for 7 minutes by setting a pressure of 2 MPa at the hydraulic gauge (pressure at the press: 0.55 MPa). Then, the die was transferred to the cooling press and kept there at 30° C. for 3 minutes by setting a pressure of 5 MPa at the hydraulic gauge (pressure at the press: 1.38 MPa). Accordingly, a carbon-fiber-reinforced plastic laminate was obtained to have a carbon fiber volume ratio (Vf) of 17%.

Comparative Example 3

A carbon-fiber-reinforced plastic laminate with a carbon fiber volume ratio (Vf) of 17% was prepared by employing the same method as in Example 3 except that a 1.0 mm-thick polypropylene sheet (product name: BC8, made by Japan Polypropylene Corporation) was used. Evaluations were conducted accordingly.

(Carbon-fiber-reinforced Sheet Formed Only with Layer (A))

A carbon-fiber reinforced plastic laminate with a carbon fiber volume ratio (Vf) of 34% was prepared by employing the same method as in Example 3 except that carbon-fiber-reinforced random sheets laminated as specified in Table 3 were set in a 300 mm-square×2.0 mm-deep core/cavity die. Evaluations were conducted accordingly.

TABLE 3

| | | Example 3 | Comp. Example 3 | Comp. Example 3 |
|---|---|---|---|---|
| Structure of PPG | slit angle θ (°) | no slits | no slits | no slits |
| | total length la (m) of slits per 1 m$^2$ | | | |
| | fiber length L (mm) | | | |
| | average slit length l (/m$^2$) | | | |
| Layer structure of laminate | surface layer | random sheet (0.5 mm) | random sheet (0.5 mm) | fluid slits (0.5 mm) |
| | middle layer | polypropylene resin sheet (1.0 mm) | BC8 (1.0 mm) | |
| | surface layer | random sheet (0.5 mm) | random sheet (0.5 mm) | |
| Entire thickness of laminate (mm) | | 2 | 2 | 2 |
| Average Vf of laminate (%) | | 17 | 17 | 34 |
| (Both surface layers)/middle layer | | 1 | 1 | |
| Interlaminar T-peel strength (N/15 mm) | | 9 | substrate failure | |
| Deflection of layer (B) when test force is attenuated 85% from peak value | | 27 | 20 | |
| High-speed puncture test | Impact-absorbing energy (J) | 8 | 6 | 8 |
| | Evaluation | Δ | X | |
| Bending test | 0° flexural strength (MPa) | 300 | 320 | |
| | 0° flexural modulus (GPa) | 22 | 23 | |
| | Evaluation | ○ | ○ | |

As shown in Table 3, Example 3 exhibited excellent impact resistance and mechanical characteristics and proved that it was suitable for use as a structural component.

INDUSTRIAL APPLICABILITY

The carbon-fiber-reinforced plastic laminate related to the present invention exhibits excellent mechanical characteristics and impact resistance suitable for use as a structural component; since the laminate has excellent moldability and its mechanical characteristics show fewer variations, the laminate is moldable in a shorter period of time at lower cost.

DESCRIPTION OF NUMERICAL REFERENCES 1 double-belt hot-pressing machine
2 press roll
12 belt
14 IR heater
16 hot-water roll
18 haul-off roll
20 drive roll
22 auxiliary roll
24 guide roll
100 prepreg laminate
120 fiber-reinforced plastic

What is claimed is:

1. A laminate formed to be at least triple-layered, comprising:
    a layer (B) between two fiber-reinforced resin sheets,
    wherein the layer (B) is a resin sheet comprising a resin,
    wherein the resin in the resin sheet of layer (B) is one type selected from the group consisting of:
    a resin mixture formed by adding a thermoplastic elastomer resin with a density of 0.86 to 0.92 g/cm³ to a polyamide resin; and
    a polycarbonate resin having a melt volume rate (MVR) of 9 cm³/10 min or lower when measured under conditions of 300° C. and a load of 1.2 kg, and
    wherein the layer (B) has a displacement of 21 mm or greater measured when a test force (kN) is attenuated 85% from its peak value in an S-S waveform curve obtained by a high-speed puncture test according to ISO 6603-2 wherein a 100 mm×100 mm test piece is cut out from a 2 mm-thick sheet and test conditions are set to be a striker diameter of 12 mm, a hole diameter of a pressing jig of 76 mm, and a velocity at impact of 5 m/sec, and
    wherein when the total thicknesses of the fiber-reinforced resin sheets are divided by the entire thickness of layer (B), the value is 0.5 to 3.0.

2. The laminate according to claim 1, wherein each of the fiber-reinforced resin sheets is a laminated substrate formed by laminating a plurality of sheets of a prepreg comprising unidirectional reinforcing fibers and a matrix resin, and the laminate is obtained by aligning reinforcing fibers in the prepreg sheets to be quasi-isotropic, or by alternately laminating prepreg sheets in such a way that when the direction of reinforcing fibers in a prepreg is set to be zero degrees, the direction of reinforcing fibers in its adjacent prepreg is set to be 90 degrees.

3. The laminate according to claim 1, wherein the resin in the resin sheet of layer (B) is the resin mixture formed by adding the thermoplastic elastomer resin with a density of 0.86 to 0.92 g/cm³ to the polyamide resin.

4. The laminate according to claim 1, wherein the resin of the resin sheet in layer (B) comprises the polyamide resin and an α-olefin polymer, and the α-olefin polymer is combined at 0 to 50 parts by weight per 100 parts by weight of the polyamide resin.

5. The laminate according to claim 1, wherein the fiber-reinforced resin sheets are each a laminated substrate formed by laminating a plurality of sheets of a prepreg comprising unidirectional reinforcing fibers and a matrix resin, slits are made in the prepreg at a depth that cuts through the unidirectional reinforcing fibers in a transverse direction, the slits are linear, the direction of the slits is set to have an angle of 30 to 60 degrees relative to the direction of the carbon fibers, and the total length of slits per 1 m² of a prepreg is 20 m to 250 m.

6. The laminate according to claim 5, wherein an average fiber length of the reinforcing fibers is set to be 10 mm to 50 mm.

7. The laminate according to claim 1, wherein a volume content ratio of reinforcing fibers in the fiber-reinforced resin sheet is set to be 20% to 60%.

8. The laminate according to claim 1, wherein the type of the matrix resin in the fiber-reinforced resin sheet is the same as that of the resin sheet in layer (B).

9. The laminate according to claim 1, wherein the interlaminar T-peel strength of the laminate is set to be 12N/15 mm or greater.

10. The laminate according to claim 1, wherein the reinforcing fibers in the fiber-reinforced resin sheet are carbon fibers.

11. The laminate according to claim 1, wherein reinforcing fibers of the fiber-reinforced resin sheet are carbon fibers having an average single fiber fineness of 0.5 dtex to 2.4 dtex.

12. The laminate according to claim 1, wherein the number of filaments in a fiber tow used for reinforcing fibers of the fiber-reinforced resin sheet is set to be 3,000 to 100,000.

13. The laminate according to claim 1, having a thickness of 2 mm or more, an elastic modulus of 20 GPa or higher, and a value of 6.0 J/mm or higher when an impact-absorbing energy of the laminate calculated by high-speed puncture testing below is divided by the thickness of the laminate, wherein the impact-absorbing energy is calculated in accordance with ISO 6603-2 wherein a 100 mm×100 mm test piece is prepared by cutting it out from the laminate and test conditions are set to be a striker diameter of 12 mm, a hole diameter of pressing jig of 76 mm, and a velocity at impact of 5 m/sec, and the impact-absorbing energy of the test piece is calculated from the area in the S-S curve obtained by the test.

14. The laminate according to claim 1, wherein the resin in the resin sheet of layer (B) is the polycarbonate resin having a melt volume rate (MVR) of 9 cm³/10 min or lower when measured under conditions of 300° C. and a load of 1.2 kg.

15. The laminate according to claim 1, wherein the resin sheet of layer (B) consists of the resin and optionally at least one additive selected from the group consisting of a colorant, an antioxidant, a metal deactivator, carbon black, a nucleating agent, a mold release agent, a lubricant, an antistatic agent, a photostabilizer, a UV absorber, an impact modifier, a melt tension improver, and a flame retardant.

* * * * *